No. 784,378.                                                                 Patented March 7, 1905.

UNITED STATES PATENT OFFICE.

ORLANDO FREDERICK BENTON, OF ST. MARYS, OHIO, ASSIGNOR OF ONE-HALF TO JESSE SHIMP, OF ST. MARYS, OHIO.

COMPOSITION FOR PRESERVING INDIA-RUBBER GOODS.

SPECIFICATION forming part of Letters Patent No. 784,378, dated March 7, 1905.

Application filed October 12, 1903. Serial No. 176,659.

*To all whom it may concern:*

Be it known that I, ORLANDO FREDERICK BENTON, a citizen of the United States, residing at St. Marys, in the county of Auglaize and State of Ohio, have invented new and useful Improvements in Compositions for Preserving India-Rubber Goods, of which the following is a specification.

This invention or discovery relates to a chemical composition for the treatment of india-rubber and the like articles manufactured therefrom, and has for its object to provide a preservative that will prevent decomposition or what is more commonly known as "rubber-rot."

It is well-known that rubber products are subject to a gradual decay, both from the inherent qualities of the rubber and the atmospherical conditions, which soon destroys the usefulness and commercial value of the goods and is the cause of considerable financial losses.

In the use of the composition hereinafter set forth the life of all rubber articles will be greatly prolonged and kept in soft pliable condition free from cracks and roughness.

The composition consists of turpentine, camphor-gum, and linseed-oil, compounded without heating. The proportions are about as follows: To one part of the turpentine add as much of the camphor-gum as will be readily dissolved. Then add the linseed-oil in the proportion of one part oil to the combined proportion of the turpentine and camphor. The camphor-gum acts as a binder for the other elements and also has the effect of closing the porous surfaces in the article or fabric to which it is applied and largely prevents the evaporation of the composition, and thereby greatly lengthens the time between repeated applications.

The preparation is usually applied with a brush or sponge and is quickly absorbed into the body of the rubber goods. The exact quantity to be used will be readily ascertained by experimental use and in accordance with the nature and thickness of the article to which it is applied. Ordinarily an application of the composition will last from two to three months and should be repeated when necessary.

The composition is especially useful in connection with such rubber goods as belting, hose, coats, boots and shoes, and many articles in which rubber enters as a part. It is also beneficial when applied to oil-cloth, vehicle-tops, enameled and patent leather goods. When used on new goods and before the same have been affected by atmospheric changes, the life of the article is greatly lengthened.

The composition imparts no adhesive qualities, does not stain or change the color of the goods, or present any other objectionable features.

Having thus described my invention, what I claim, and desire to secure by Letters Patent, is—

A composition for preserving india-rubber, consisting of one part turpentine, as much camphor-gum as the turpentine will readily dissolve, and one part linseed-oil proportioned to the combined part of turpentine and camphor-gum.

In testimony whereof I have signed my name to this specification in the presence of two subscribing witnesses.

ORLANDO FREDERICK BENTON.

Witnesses:
    H. L. DUNATHAN,
    JESSE SHIMP.